Patented Feb. 12, 1924.

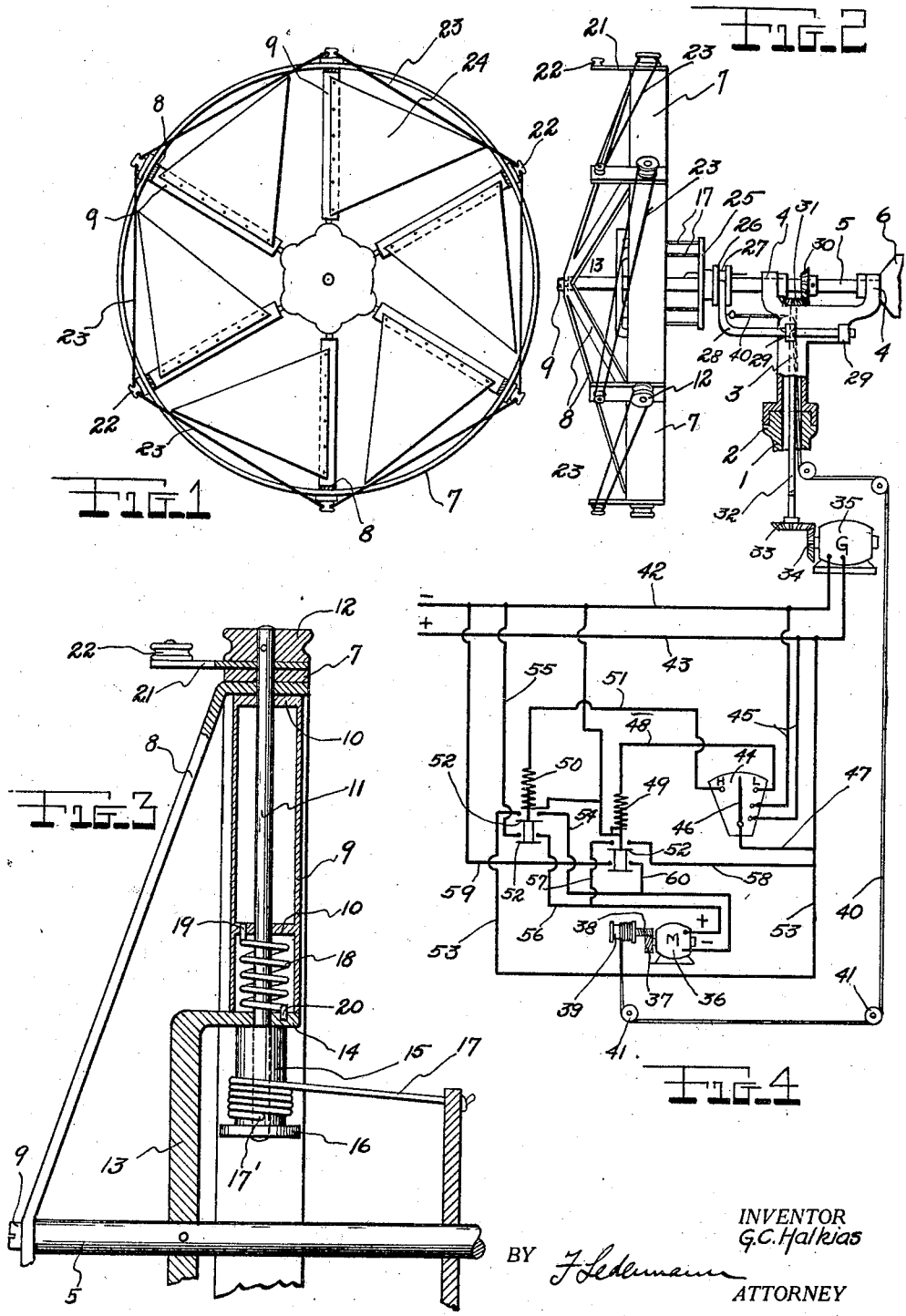

1,483,301

UNITED STATES PATENT OFFICE.

GEORGE C. HALKIAS, OF NEW YORK, N. Y.

POWER WINDMILL.

Application filed June 6, 1922. Serial No. 566,252.

*To all whom it may concern:*

Be it known that I, GEORGE C. HALKIAS, a citizen of Greece, residing at New York, in the county of New York and State of New York, have invented certain new and useful Improvements in Power Windmills, of which the following is a specification.

This invention relates to wind mills, particularly to that type which serves to generate electrical power, the main object being to provide a wind mill with adjustable vanes or blades and so designed as to overcome the speed variations owing to the change in wind speed, giving it a substantially constant speed.

Another object is to provide an electrically operated means associated with the wind mill, so that when the effective areas of the aforesaid vanes or blades are varied, the voltage generated remains substantially constant without great fluctuation.

These and other objects will become apparent in the description below, in which characters of reference refer to the like-named parts in the drawing.

Referring briefly to the drawing, Figure 1 is a front elevational view of the wind mill the rim support braces being omitted, and showing the vanes in extended position.

Figure 2 is a side elevational view of Figure 1 showing the entire device mounted on a pedestal.

Figure 3 is a framentary sectional elevational view thru one of the wind vane masts.

Figure 4 is a wiring diagram of the electrical controlling means for the wind vanes; the entire circuit to the generator is also shown.

Describing the drawing in detail, the numeral 1 indicates a hollow pedestal which is preferably mounted in place where the device is at all times exposed to the wind. A shoulder 2 on said pedestal seats a bracket 3 provided with bearing lugs 4 in which the main shaft 5 is rotatably mounted. A rudder vane 6 aligned with the axis of said shaft extends outwardly from the rear bearing and guides the device directly into the wind.

An annular ring 7 concentrically mounted about the shaft 5 by the angular support braces 8, the latter being secured to the said rim at spaced intervals and converge toward the end of the shaft 5, to which they are secured by a suitable bolt 9.

A plurality of radially disposed masts 9ª are provided with collars 10, the latter being rotatably mounted on the spindles 11. Said spindles pass thru the rim 1 and have relatively large pulleys 12 securely pinned thereto. A spider bracket 13 rigidly mounted on the shaft 5 has a plurality of radially spaced ears 14, each of which provides a support for a mast 9ª and also journals the lower end of spindle 11.

A drum 15 secured to the lower end of the spindle 11 has a flange 16 thereon. A cable 17 or other like means has its one end secured to the periphery of said drum 15 and describes a number of turns thereon.

A spring 18 mounted on the spindle 11 between the lower collar 10 and the support 14 has its upper end attached to the collar 10 which rotates with the mast 9ª. The lower end of said spring is similarly secured to the ear 14, the later being fixed with respect to the axis of the mast 9ª. Said spring when not under restraint rotates the mast 9ª and pulley 12 and exposes the extreme area of the vane 24 to the wind.

An arm 21 is secured to the rim 7 beneath each of the pulleys 12 and extends outwardly parallel to the axis of shaft 5. The outer ends of said arms pivotally support idler shieve wheels 22. An endless string 23 connects the pulley 12 of one mast with the shieve wheel 22 supported on the adjacent arm 21.

Each of the masts 9ª has one edge of a substantially triangular vane 24 tacked thereto. Said vanes are preferably composed of a tough and extremely flexible material, such as sailcloth or canvas. The vertex of each vane is permanently connected to its corresponding string 23.

A face plate 25 is slidably mounted in a substantially central position on the shaft 5 and has a collar 26 integral therewith in which a channel 27 is formed. The aforesaid cables 17 are securely fixed to the face plate 25, as illustrated in Figure 2. A yoked lever 28 is engaged in the annular channel 27 and slides with the latter. Lugs 29 projecting from the side of the pivoted brackets 3 form bearings in which the yoke lever slides.

A bevel gear 30 pinned to the shaft between the main bracket bearing lugs 4, meshes with a bevel pinion 31, the latter being mounted on a vertical transmission shaft 32 which has a bevel gear 33 secured to its lower end. A similar gear 34 in mesh with the said gear 33 drives the main shaft of a generator 35.

A reversible electric motor 36 mounted at some point distant from the device has a worm gear 37 secured to its shaft, said gear 37 meshing with and driving a worm 38. A drum 39 secured to the worm 38 has one end of a wire cable 40 secured thereto which passes around a series of grooved pulleys 41 and has its opposite end attached to the yoke lever 28.

In use, after the device has been installed, electrical current is generated in the generator 35 by the rotation of the main shaft 5, the latter being moved by the vanes 24 in an obvious manner. Gears 30 and 31 transmit the rotation to the vertical shaft 32 which is connected to the generator shaft by the gears 33 and 34.

The main feed lines 42 and 43 are directly connected to the generator 35. The voltmeter 44 is primarily designed to indicate the voltage between two positions, as for instance 110 and 120, the former being the low and the latter the high point. Leads 45 permanently connect the voltmeter to the feed wires 42 and 43. A pivoted needle 46 which contacts with either of the high or low points of the voltmeter is also permanently connected to the main positive feed wire by a lead 47. A plunger solenoid 49 is connected in series between the low contact terminal "L" and the negative feed wire 42 of the generator thru the lead 48. A second solenoid 50 is connected between the negative feed wire 42 and high point "H" of the voltmeter by the lead 51. The plungers of the solenoid 50 and 49 are provided with axially spaced apart contacting lips 52 which are insulated from each other. A lead 53 fixed above the lip 52 of the plunger solenoid joins the main feed wire 43, and a similar lead 54 diametrically opposite provides a negative lead to the motor 36. Both of said leads are bridged and closed when the plunger is attracted into the solenoid 50. The lower lip of the plunger of solenoid 50 bridges a lead 55 joined to the main feed wire 42, and a similar lead 56 connected to the positive terminal of the motor 36.

The upper lips of the plunger of solenoid 49 similarly close the circuit, when the plunger is attracted by a lead 57 which is connected to the positive motor lead 52, and a lead 58 which joins the lead 53 and passes to the generator 35. A lead 59 joining the main lead 42 and a lead 60, connected to the negative lead 54 of the motor 36, are bridged and closed when the corresponding lips 52 of the plunger solenoid 49 are attracted.

When in operation the vanes 24 rotate the entire device with the shaft 5, which rotation is transmitted to the generator 35 thru the gears 30 and 31, and 33 and 34.

When the wind is of relatively low velocity the voltage generated by the generator 35 will be lowered and indicated by the needle 46 which will move to the "L" side of the voltmeter 44. In so doing, the circuit thru the lead 48, between the voltmeter and the solenoid 49 is closed. When said circuit is closed the solenoid 49 is energized and retracts the plunger. The plunger lips 52 close the auxiliary motor circuit and cause the drum 39 to pay out the string 40 which rotates the masts 9ª thru the drum 15, and thus presents a greater vane area to the wind so that the rotation of the generator is speeded up.

Similarly when the generator speed is increased above the "H" terminal of the voltmeter needle 46 will close a circuit and will energize solenoid 50 and retract its solenoid 52. The latter closes the auxiliary circuit and causes the motor to rotate in an opposite direction thus taking up the string 40 and paying out its cables 17. The said cables rotate the masts and roll the superfluous vane area thereupon, the speed of the generator being thereby lowered until the needle 44 leaves the terminal "H."

From the foregoing it is apparent that the speed of the shaft 5 is governed by the voltmeter which prescribes the limits between the "H" and "L" terminals.

I claim:—

1. A device of the class described comprising a pivoted main bracket, a shaft rotatable therein, an annular rim about said shaft, radially disposed spindles having hollow masts integral therewith, flexible vanes on said masts, pulleys on said spindles, rollers offset from said pulleys on each of said spindles and adjacent said pulleys, a string connecting a mast pulley with the roller offset from the adjacent mast, the free ends of said vanes being secured to said strings, means for furling said vanes upon the mast, and means for automatically unfurling said wind vanes.

2. A device of the class described comprising a pivoted main bracket, a shaft rotatable therein, a rim secured about said shaft and adapted to rotate therewith, hollow masts radially mounted on said rims, spindles in said masts, drums on said spindles, a reversible type of motor mounted distant from said fan device, vanes mounted on said masts adapted to be furled when the said mast is rotated, means connecting said motor with the spindle drums, said motor adapted to rotate the spindle drums when rotated, spring members wound about said spindles adapted to rotate said masts to unfurl the vanes, and means for controlling the speed of said device within fixed limits.

In witness whereof I affix my signature.

GEORGE C. HALKIAS.